UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

DIANTHRAQUINONYL-DIALDEHYDES AND PROCESS OF MAKING THEM.

1,004,433.  Specification of Letters Patent.  Patented Sept. 26, 1911.

No Drawing.  Application filed July 1, 1911. Serial No. 636,489.

*To all whom it may concern:*

Be it known that I, MAX HENRY ISLER, citizen of the Swiss Republic, residing at Mannheim, Germany, have invented new and useful Improvements in Dianthraquinonyl-Dialdehydes and Processes of Making Them, of which the following is a specification.

I have found that by treating 1-halogen-anthraquinone-2-aldehyde:—

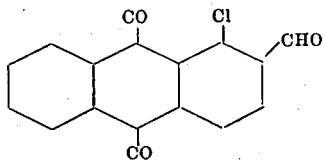

(presuming the chloro compound to be employed), or a derivative thereof, with a substance which is capable of splitting off halogen, such for instance as copper, and preferably while employing a diluent, such as naphthalene or nitrobenzene, and a substance with an alkaline reaction, such as sodium carbonate and potash, new condensation products can be obtained which are formed by the removal of the halogen from the molecule, whereupon two residues combine together. Thus, from a 1-halogen-anthraquinone-2-aldehyde itself a compound is obtained which, according to analysis, appears to be 1.1'-dianthraquinonyl-2.2'-dialdehyde of a constitution corresponding to the formula:—

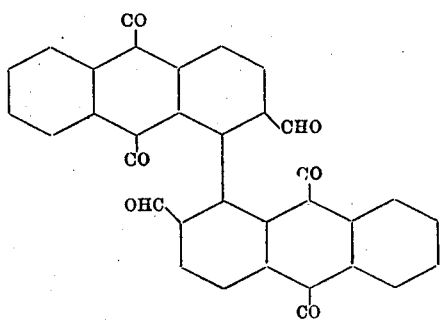

My new compounds are characterized by being insoluble in caustic soda solution, soluble with a reddish color in concentrated sulfuric acid, difficultly soluble in most of the ordinary solvents, but soluble in hot solvents of high boiling point. Further by treatment with a condensation agent, preferably one which possesses a reducing action, they are converted into coloring matters which are identical with those obtainable from a 2.2'-dimethyl-1.1'-dianthraquinonyl body as described and claimed in Patent No. 856,811, the said coloring matters yielding a red vat with alkaline hydrosulfite, and dyeing cotton yellow or orange shades. The conversion of the dianthraquinonyl-dialdehyde bodies into the coloring matters takes place very easily; for instance, it can be effected by treatment of the intermediate products with aqueous hydrosulfite, consequently the coloring matter can be produced either in bulk, or the ring formation can be caused to take place in the dye-bath, or even on the fiber.

The following examples will serve to illustrate further how this invention can be carried into practical effect and how the 1.1'-dianthraquinonyl-2.2'-dialdehyhe bodies can be converted into coloring matters, but my invention is not confined to these examples. The parts are by weight.

Example 1: Boil together, for a few hours, ten parts of 1-chlor-anthraquinone-2-aldehyde, thirty parts of nitrobenzene, or naphthalene, three parts of finely divided copper, and two parts of potassium carbonate, and then remove the nitrobenzene, or the naphthalene, by means of steam, or alcohol, or benzine, or the like, and treat the residue with dilute nitric acid in order to remove the copper and the copper salts. The new condensation product can be purified by crystallizing it from ortho-dichlorbenzene. It yields a reddish yellow solution in concentrated sulfuric acid. It is insoluble in caustic soda, difficultly soluble in most of the ordinary solvents, but easily soluble in hot solvents of a high boiling point. In a similar manner the corresponding compounds can be obtained from derivatives of 1-halogen-anthraquinone-2-aldehyde.

Example 2: Boil together, for a few hours, ten parts of 1.6-dichlor-anthraquinone-2-aldehyde, from twenty to thirty parts of naphthalene, or nitrobenzene, three parts of finely divided copper powder, and two parts of potassium carbonate. On working up the product as described in the foregoing example 1, 6.6'-dichlor-1.1'-dianthraquinonyl-2.2'-dialdehyde is obtained. In a similar manner, the corresponding compound can be obtained from 1.7-dichlor-anthraquinone-2-aldehyde, or from a mixture of 1.6- and 1.7-dichlor-anthraquinone-2-aldehyde. These initial materials can be obtained from the corresponding 6- or 7-chlor-1-amino-2-methyl-anthraquinone described in the specification of British Letters Patent No. 10,412/08 by replacing the amino group with chlorin according to Sandmeyer's process, and then oxidizing the methyl group to an aldehyde group as described in the specification of British Letters Patent No. 16,632/05.

In manners similar to those described in the foregoing examples 1 and 2, other derivatives of 1-halogen-anthraquinone-2-aldehyde can be converted into the corresponding dianthraquinonyl-dialdehyde derivatives.

Example 3: Mix together one hundred parts of 1.1'-dianthraquinonyl-2.2'-dialdehyde (in the condition of a ten per cent. paste), from two thousand to four thousand parts of water, fifty parts of solid sodium hydrosulfite, and one hundred parts of twenty-four per cent. caustic soda solution. On warming the solution, the color changes to a brilliant carmine red. Maintain the mixture, for from thirty to sixty minutes, at from fifty to eighty degrees centigrade, and then precipitate the coloring matter by blowing air through the solution.

Example 4: Dissolve ten parts of powdered 1.1'-dianthraquinonyl-2.2'-dialdehyde in one hundred parts of ninety-seven per cent. sulfuric acid and then add, gradually, fifteen parts of water until a slight precipitate just commences to be formed. Then stir in five parts of zinc dust, continue stirring for from one to two hours at the temperature of the water-bath, and then isolate the coloring matter by diluting with water, boiling, filtering, and washing. The coloring matter can be obtained in a pure condition by extracting it with boiling glacial acetic acid. It appears to be identical with the coloring matter obtainable according to the foregoing example 3.

Example 5: Heat together, gradually, at from fifty to seventy degrees centigrade, from twenty-five hundred to five thousand parts of water, one hundred parts of cotton, and twenty parts of 1.1'-dianthraquinonyl-2.2'-dialdehyde (in the condition of a ten per cent. paste), one hundred parts of twenty-four per cent. caustic soda solution, and ten parts of solid sodium hydrosulfite. The formation and fixing of the hydro compound of the coloring matter takes place at the same time. The dyeing is then developed by hanging the cotton in the air and afterward boiling it in soap solution.

Example 6: Prepare a printing paste from two hundred parts of 1.1'-dianthraquinonyl-2.2'-dialdehyde (in the condition of a ten per cent. paste), one hundred and twenty parts of Rongalite C, fifty parts of glycerin, and six hundred and thirty parts of an alkaline thickening (obtained by mixing together one hundred parts of solid dextrine, three hundred and fifty parts of fifty per cent. gum arabic, five hundred parts of forty-one per cent. caustic soda solution, twenty parts of turpentine, and thirty parts of glycerin). Print this paste on the material, dry, steam for five minutes in a Mather-Platt apparatus and wash and soap. The coloring matter is thus formed directly on the fiber. If desired, the material, before being soaped, can be passed through a bath containing sodium bichromate.

Now what I claim is:—

1. The process of producing a 1.1'-dianthraquinonyl-2.2'-dialdehyde body by treating a 1-halogen-anthraquinone-2-aldehyde body with a substance which is capable of splitting off halogen.

2. The process of producing 1.1'-dianthraquinonyl-2.2'-dialdehyde by treating 1-chlor-anthraquinone-2-aldehyde with copper powder.

3. As new articles of manufacture 1.1'-dianthraquinonyl-2.2'-dialdehyde bodies, which are insoluble in caustic soda solution, soluble with a reddish color in concentrated sulfuric acid, difficultly soluble in most of the ordinary solvents, but soluble in hot solvents of high boiling point, and which by treatment with a condensation agent are converted into coloring matters yielding red vats with alkaline hydrosulfite and dyeing cotton yellow to orange shades.

4. As a new article of manufacture 1.1'-dianthraquinonyl-2.2'-dialdehyde which is insoluble in caustic alkali solution, soluble with a reddish color in concentrated sulfuric acid, difficultly soluble in most of the ordinary solvents, but soluble in hot solvents of high boiling point, and which on treatment with alkaline hydrosulfite yields a red vat which dyes cotton orange shades of excellent fastness.

In testimony whereof I have hereunto set my hand in the presence of two subscribing witnesses.

MAX HENRY ISLER.

Witnesses:
ERNEST G. EHRHARDT,
J. ALEC. LLOYD.

Correction in Letters Patent No. 1,004,433.

It is hereby certified that in Letters Patent No. 1,004,433, granted September 26, 1911, upon the application of Max Henry Isler, of Mannheim, Germany, for an improvement in "Dianthraquinonyl-Dialdehydes and Processes of Making Them," an error appears in the printed specification requiring correction as follows: Page 1, the formulas following lines 10 and 35, strike out the lines leading to the letters "CO" and place the letters on the points of the symbols to which they belong; and that the said Letters Patent should be read with this correction therein that the same may conform to the record of the case in the Patent Office.

Signed and sealed this 26th day of December, A. D., 1911.

[SEAL.]

C. C. BILLINGS,
*Acting Commissioner of Patents.*